(12) United States Patent
Klaus

(10) Patent No.: US 9,970,692 B2
(45) Date of Patent: May 15, 2018

(54) WATER-INJECTED GAS COMPRESSOR AND METHOD FOR CONTROLLING THE WATER SUPPLY

(71) Applicant: Gardner Denver Deutschland GmbH, Bad Neustadt (DE)

(72) Inventor: Frank Georg Klaus, Zell-Barl (DE)

(73) Assignee: GARDNER DENVER DEUTSCHLAND GMBH, Bad Neustadt (DE)

( * ) Notice: Subject to any disclaimer, the term of this patent is extended or adjusted under 35 U.S.C. 154(b) by 439 days.

(21) Appl. No.: 14/296,222

(22) Filed: Jun. 4, 2014

(65) Prior Publication Data
US 2014/0363310 A1  Dec. 11, 2014

(30) Foreign Application Priority Data

Jun. 7, 2013  (DE) .......................... 10 2013 105 895

(51) Int. Cl.
*G05D 11/08*  (2006.01)
*F04C 29/04*  (2006.01)
(Continued)

(52) U.S. Cl.
CPC ............ *F25B 31/008* (2013.01); *F04C 28/28* (2013.01); *F04C 29/0014* (2013.01);
(Continued)

(58) Field of Classification Search
CPC .. F04C 28/28; F04C 29/0014; F04C 2270/24; F04C 15/0096; F04C 29/04;
(Continued)

(56) References Cited

U.S. PATENT DOCUMENTS 5,855,791 A * 1/1999 Hays ....................... C02F 1/008
                                                       137/3
6,102,683 A    8/2000 Kirsten
(Continued)

FOREIGN PATENT DOCUMENTS

DE    197 29 498 A1    2/1999
DE    10 151 175 A1    4/2003
(Continued)

OTHER PUBLICATIONS

Extended European Search Report for EP Appl. No. 14171207.5, dated May 13, 2015, 4 pages.
German search report related to priority application DE 10 2013 105 895.7, dated Jan. 16, 2014 (6 pages).
Examination Report from the European Patent Office for Application No. 14171207.5 dated Feb. 15, 2017 (5 pages).

*Primary Examiner* — Dominick L Plakkoottam
*Assistant Examiner* — Philip Stimpert
(74) *Attorney, Agent, or Firm* — Michael Best & Friedrich LLP

(57) ABSTRACT

The invention relates to a method for controlling the water supply of a water-injected compressor, into the cooling water circuit of which is injected demineralized and non-demineralized water as fresh water. The method according to the invention is characterized in that the fresh water supplied is a mixture of demineralized and non-demineralized water, and the proportions of the demineralized and non-demineralized water in the fresh water are dependent on the conductivity of the demineralized and non-demineralized water. The invention also relates to a water-injected gas compressor that may be operated with such a method.

15 Claims, 1 Drawing Sheet

(51) Int. Cl.
*F25B 31/00* (2006.01)
*F04C 28/28* (2006.01)
*F04C 29/00* (2006.01)
*C05F 5/00* (2006.01)

(52) U.S. Cl.
CPC ............... *G05D 11/08* (2013.01); *C05F 5/00* (2013.01); *F04C 2270/24* (2013.01)

(58) Field of Classification Search
CPC .. F04C 29/042; F04D 29/582; F04D 29/5826; F04D 29/5833; F04D 29/5846; F25B 31/006; F25B 31/008; F25B 2500/04; F25B 2500/06; F25B 2500/25; F25B 2500/2515
USPC ........... 210/96.1, 198.1, 662, 696, 739, 746; 137/3, 5, 93
See application file for complete search history.

(56) References Cited

U.S. PATENT DOCUMENTS

| | | | |
|---|---|---|---|
| 6,174,148 | B1 | 1/2001 | Suzuki |
| 6,287,084 | B1* | 9/2001 | Kirsten ................ C02F 1/008 417/228 |
| 2009/0232688 | A1 | 9/2009 | Heremans |
| 2010/0233004 | A1 | 9/2010 | Matsuzaka et al. |

FOREIGN PATENT DOCUMENTS

| | | |
|---|---|---|
| DE | 69911695 | 4/2004 |
| DE | 10 307 803 B4 | 10/2005 |
| DE | 10 2004 053 895 A1 | 5/2006 |
| DE | 10 151 176 B4 | 2/2008 |
| EP | 0 800 622 B1 | 2/2002 |
| EP | 0 974 754 B1 | 10/2003 |
| JP | 2007218209 A | 8/2007 |

* cited by examiner

WATER-INJECTED GAS COMPRESSOR AND METHOD FOR CONTROLLING THE WATER SUPPLY

FIELD OF INVENTION

The invention relates to a method for controlling the water supply of a water-injected gas compressor. Furthermore, the invention relates to a water-injected gas compressor adapted to perform such a method.

BACKGROUND

Water injected compressors are used for compressing gaseous media such as air in order to make them available as a gas. Water is used for sealing, lubrication and cooling of the compressor. The injected cooling water is separated from the compressed gas after exiting the compressor. The cooling water heated by the compressor is fed to a cooling device. The cooled cooling water is then filtered and fed back into the compressor. If the cooling water reaches a high conductivity as a result of the heating (above 50° C.), then calcification significantly increases, thus causing dirt/debris to occur that impairs functioning (jamming of valves, altering spaces).

In such compressors, there may be variation of several parameters of the cooling water due to evaporation of the cooling water and/or absorption of atmospheric humidity into the cooling water. Evaporation of cooling water causes the relative mineralization of the cooling water to increase, thereby increasing sediment that can lead to compressor damage. In the opposite case, if the mineral content of the cooling water decreases due to atmospheric humidity absorption, then this has a negative effect on the buffer capacity of the cooling water to absorb free carbonic acid. Free carbonic acid in the cooling water that is not bound, is very aggressive and promotes corrosion. The pH of the cooling water may be altered by evaporation of cooling water, absorption of atmospheric humidity into the cooling water, or absorption of copper or iron ions, so that the cooling water has a corrosive effect.

DE 699 11 695 T2 discloses a screw-type compressor, in which the compressed air is cooled to a saturation temperature, the water content is condensed and separated, and the separated water content is supplied to the compressor, while excess circulating water is discharged from the water container. The recovered water contains only few impurities and balances the demineralized water. The amount of condensed water is usually greater than the amount of water which is lost through evaporation, so that continuous operation for many hours is possible without replenishment of water. The tap water used for the initial filling of the water tank that includes some impurities may be converted into pure (demineralized) water within a short time by the method described without the use of a demineralization plant. The problem here is that demineralized water cannot bind dissolved carbonic acid and thus the pH decreases. A reduced pH leads to increased corrosion.

EP 0 800 622 B1 discloses a compressor installation with a water-injected compressor, in which the cooling water that is free of additives is circulated in a circulation circuit. A water treatment device binding mineral deposits is arranged in the circulation circuit. The injection into the compressor is so designed that the compressor performs nearly isothermal compression, whereby the temperature of the outlet gas overshoots or undershoots the inlet gas temperature by less than 10 K. The compressor system described above may be considered as a quasi-closed system that allows operation with a closed circuit. If the gas to be compressed is supplied with a quantity of moisture that also leaves the compressor installation in the compressed air, the quantity in the cooling water remains constant and the circulation circuit may be operated closed to the outside.

US 2009/0232688 A1 discloses a compressor system comprising a water-injected compressor with an inlet pipe and an outlet pipe, an air-intake filter connected to the inlet pipe, a water separator into which the outlet pipe empties and a recirculation pipe arranged between the water separator and the compressor. The air-intake filter comprises a housing having an air inlet and an air outlet, to which the inlet pipe is connected, and a substrate disposed in the housing in the form of a material with an open cell structure through which the air is sucked in. The air-intake filter comprises a wet filter to which a water supply is connected. The water supply comprises at least a pipe connected to the water separator and a supply device for additional water. Upon falling below a predetermined level in the water, additional water is supplied. The additionally supplied water is chemically pure, i.e. it does not affect the mineralization or the pH of the cooling water.

DE 197 29 498 A1 discloses a compressor system having a compressor with water injection cooling, and in the cooling water circuit of which is arranged a measuring device for determining the conductivity of the cooling water. The compressor unit further comprises a water supply source for the supply of non-demineralized water and demineralized water as well as a regulating device. The regulating device controls the supply into the cooling water circuit from the water supply source of demineralized water in the case of overshooting an upper conductivity limit and the supply of non-demineralized water in the case of undershooting a lower conductivity limit. In this way, the pH and the mineralization of the water should be so controlled that corrosion by the cooling water and sedimentation in the cooling water is reduced. A problem with this solution is that the ion concentration of other ions, i.e. the number of copper ions in the cooling water circuit increases over time through frequently unavoidable corrosion processes in the cooling water circuit, i.e. by corrosion of copper. These other ions lead to an increase in conductivity, although the amount of calcium carbonate does not change. Due to the increased conductivity of the cooling water, the addition of demineralized water now decreases the calcium carbonate content in the cooling water below a desired minimum value. This means that the carbon dioxide dissolved during the compression is no longer bound by the hardness minerals (buffer effect of the calcium carbonate), and thus the pH decreases. However, a reduced pH will then lead to an increased corrosion of the parts of the compressor.

DE 101 51 176 B4 discloses a compressor system with a water-injected screw compressor for compressing gas. The screw compressor is connected to a cooling water circuit. The cooling water is injected either from a fresh water supply or a condensation plant depending on the cooling water circuit. A conductivity measurement and evaluation device for monitoring the concentration of ions is connected to the cooling water circuit, which in turn is connected to a control and regulating device. An independently formed condensation plant is arranged in the area of the suction passage of the cooling water circuit to supply a certain quantity of condensate to the screw compressor via the suction passage, so that the ion concentration in the cooling water circuit remains constant within predetermined tolerance limits. In this solution, conductivity measurement also takes place in the cooling water circuit, but this is also associated with the disadvantages described above.

DE 101 51 175 A1 describes a compressor and a method which involves subjecting water injected into or before injection into the compressor to a magnetic field intensity of a magnet arrangement determined by a parameter in order to increase the lubrication capability of the water. The method regulates the conductivity of the cooling water inside the water circuit of the compressor.

DE 103 07 803 B4 describes a compressor system including a compressor with water injection cooling supplied from a cooling water circuit, and a condensing unit for the condensing of water present in the compressed medium. A device is provided to measure the conductibility of the condensate. A control unit is provided to regulate the conductibility of the condensate.

DE 10 2004 053 895 A1 contains a compressor and a method for the exchange of water in a compressor with water injection. The exchange of at least part of the water takes place in a program-controlled manner in dependence upon parameters and/or signals from sensors. A conductivity sensor can be arranged in the water circuit.

SUMMARY

The present invention provides a method for controlling the water supply to a water-injected gas compressor. The cooling water supplied to the compressor has a quality with respect to the conductivity, and preferably also regarding further parameters as the content of calcium carbonate, and the PH. In this case, the cost and complexity of the sensors to be installed in the cooling circuit should be minimized.

The method according to the invention controls the water supply of a water-injected compressor based on an understanding that the measurement of the conductivity of the cooling water in the cooling circuit does not provide sufficiently precise information about the amount of dissolved ions present in the cooling water. To obtain more precise information from measuring the cooling water circuit, much more sophisticated measurements would be needed, but these cannot be obtained from a corresponding gas compressor at a reasonable cost. The addition of demineralized (distilled) water, insofar as such addition is governed only by the conductivity values determined in the cooling circuit, can thus lead to an undesired cooling water quality leading to an increased corrosion of the metallic parts of the compressor, thereby drastically reducing the lifetime of such systems.

In contrast, the quality of drinking water (non-demineralized water) provided on-site may be easily determined, and it may be assumed that this basic quality is not generally subject to fluctuations. The types of drinking water provided on-site could be well water, river or lake water, tanked in water, or municipal water. Although drinking water is preferred, non-demineralized water not rising to the standards of drinking water may be provided on-site. This water can be well water, river or lake water, tanked in water, or municipal water, such as recycled municipal water used for irrigation. The non-demineralized water available on site, such as drinking water, can be locally available non-demineralized water.

The invention recognizes that, based on the quality of the locally available water, such as drinking water, the proportion of demineralized water may be easily determined by measurement or calculation, in order to determine the amount of demineralized water that needs to be added to the drinking water to obtain a mixture of optimal quality water, fresh water, for the compressor, i.e. the conductivity values and the water hardness are so adjusted that sedimentation and corrosion are minimized. It is presumed drinking water would require the least measurement and calculation and non-drinking water would require more measurement and testing, all within the skill of the artisan.

A difference of the method according to the invention compared to the prior art is that one does not use the conventional measurement and control of the conductivity taking place in the cooling water circuit, but rather that one adjusts the conductivity of the supplied fresh water to a desired value by changing the proportions of the demineralized and non-demineralized water depending on the conductivity. In the simplest case, the measurement of the conductivity of the cooling water in the cooling water circuit may be completely dispensed with, although this remains possible in modified embodiments.

In comparison to the previously known methods, the method according to the invention provides the compressor with fresh water having a much more consistent conductivity and a much more consistent calcium content. The result is that, according to the invention, the water quality of the cooling water in the cooling circuit has a similar conductivity and the same desired content of calcium carbonate. This ensures that the cooling water injected during the compression process always has a consistent, optimized quality in terms of conductivity, calcium carbonate content and pH during the compression process. In contrast to the prior art method, the conductivity of the cooling water present in the cooling water circuit will not affect the composition of the supplied fresh water. Therefore, there is no longer any risk that, for example, an increase in conductivity caused by corrosion processes in the cooling water circuit could be misinterpreted as being due to an increased calcium carbonate content. By the method according to the invention, calcification and corrosion processes inside the compressor may be effectively prevented and/or minimized.

According to an advantageous embodiment, the proportions of demineralized and non-demineralized water in the fresh water are determined by means of a control unit. The control unit monitors the conductivity of the demineralized and non-demineralized water. The conductivities may in this way be manually entered as a fixed parameter by the operating personnel. This is easily possible in most cases, since the conductivity of the drinking water normally used (non-demineralized water) and the thus obtained demineralized water (distilled water) are not subject to seasonal fluctuations and are therefore almost constant. The properties of the drinking water used are normally known through local water analysis or can be determined using analysis devices. With additional knowledge of the demineralization plant, the conductivity of the demineralized water that is obtained from the drinking water may be calculated by the control unit. Measurements have shown that the conductivity of water, which has been demineralized, for example by means of a reverse osmosis system, is lower than the conductivity of the drinking water by a factor of about 10. In alternative embodiments, the controller monitors the conductivity values of the demineralized and non-demineralized water obtained by means of conductivity sensor measurement.

The non-demineralized and demineralized water is preferably supplied from a water supply source. The water supply source may include a demineralization plant for the production of demineralized water. The water supply source may be, for example, a public water supply or a private water source.

In a preferred embodiment, the amount of non-demineralized and demineralized water supplied is metered by means of corresponding valves. It has proven useful in this context, that the opening times of the valves may be determined as a function of the conductivity of the non-demineralized and demineralized water. This type of regulation can be implemented with little effort and cost-effectively.

To minimize contamination of the cooling water by bacteria and other contaminants, the cooling water in the cooling water circuit should be regularly drained and completely or partially replaced by fresh water. This is particularly important when the compressor provides compressed air, since the injected cooling water comes into direct contact with the compressed air. In this respect, the conductivity of the cooling water is used as an indicator of the degree of contamination of the cooling water, because conductivity is known to increase due to corrosion processes. The determination of the conductivity of the cooling water is preferably carried out continuously by means of a conductivity sensor. When a given conductivity value is exceeded, the cooling water in the cooling water circuit is completely or partially replaced by fresh water. In alternative embodiments, the cooling water may also be replaced by fresh water at predefined time intervals.

Further advantages, details and developments of the invention will become apparent from the following description of a preferred embodiment with reference to the drawings.

DETAILED DESCRIPTION

Figure 1:
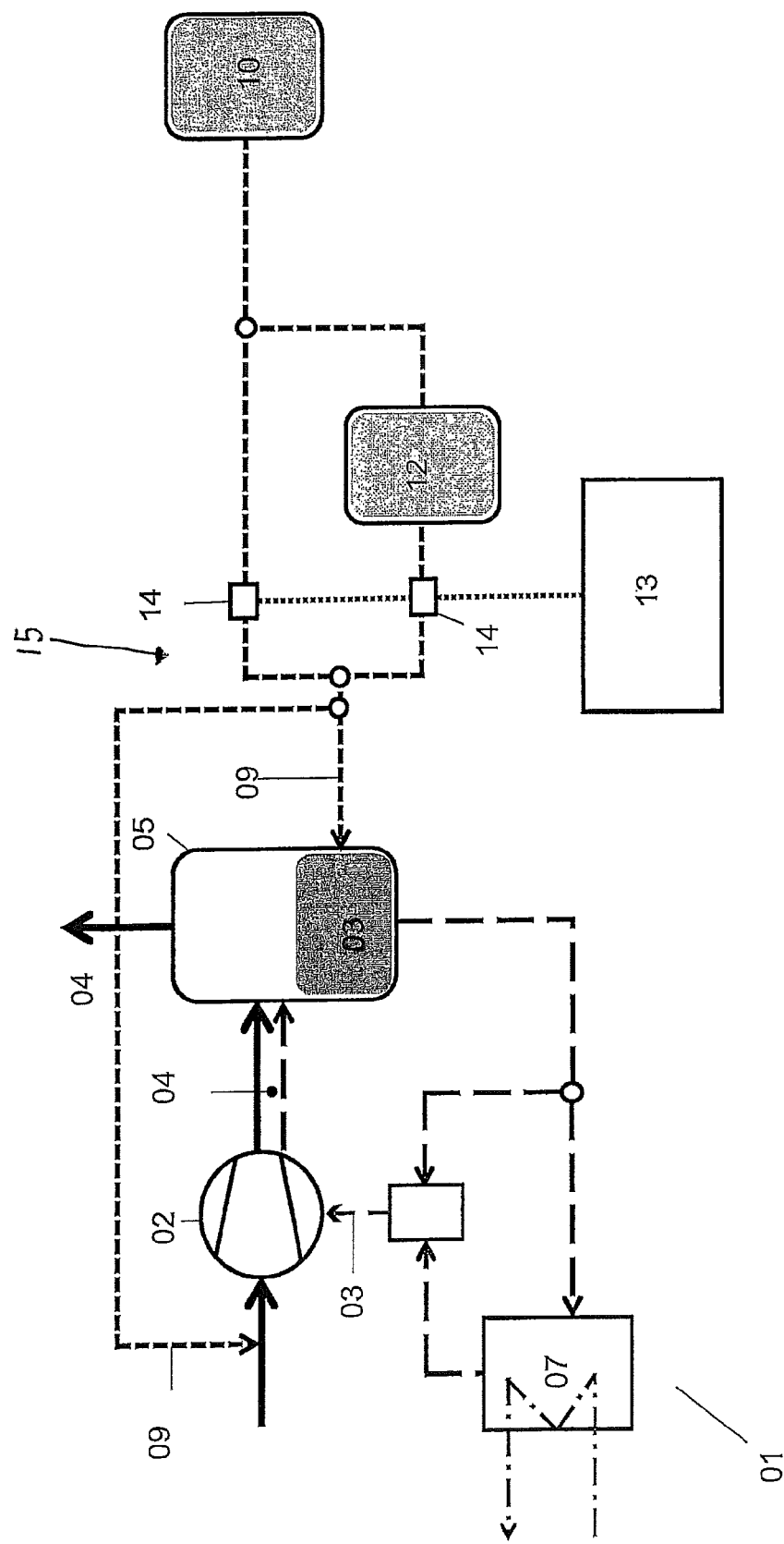
FIG. 1 shows a schematic representation of a compressor system 01 for compressing gaseous media and using the method according to the invention.

The compressor system 01 includes a compressor 02 into which the cooling water 03 is injected. The cooling water 03 is used for cooling, lubrication and sealing of the compressor 02. The injected cooling water 03 is separated from the compressed gas 04 after exiting the compressor 02 by means of the separator 05. The compressed gas 04 released from the cooling water 03 flows into a compressed air system. The separated cooling water 03, which has been heated to a temperature of e.g. 65° C. in the compressor 02 is passed through an internal heat exchanger 07 and is thereby cooled down to the desired temperature level for re-injection. The cooled cooling water 03 is optionally fed to a filtration unit and returned to the suction side of the compressor 02.

Mixing with fresh water 09 follows in order to improve the water quality of the cooling water 03 and/or compensate for any water loss that occurs. The fresh water 09 supplied consists of a mixture of non-demineralized water 10, which is supplied as a rule via a drinking water pipeline, and demineralized water 12, which is preferably obtained via a demineralization plant (not shown) from the non-demineralized water 10. The proportion of the demineralized and non-demineralized water 10, 12 in the fresh water 09 is dependent on the conductivity of the demineralized and non-demineralized water 10, 12. The proportion of the demineralized and non-demineralized water 10, 12 is determined with the help of a control unit 13 on the basis of given conductivity values and by means of conductivity sensors (not shown), for example, by calculation through implemented routines or determined from tables of stored values. The so determined quantities of liquid are metered via two valves 14 based on corresponding opening times of the valves 14. A mixing unit 15, comprising the valves 14, mixes the necessary amount of demineralized and non-demineralized water to adjust the quantity of fresh water which is fed as cooling water into the compressor 02. The fresh water 09 thus produced and supplied to the compressor 02 has a consistent conductivity, a consistent amount of calcium carbonate and a pH value suitable for the application. As a result, the cooling water 03 in the cooling water circuit also has optimum water quality.

In practice it has been shown that a water-injected compressor 02 works well when the conductivity of the cooling water 03 lies between 100 and 200 µS/cm. On the one hand, there is little precipitation of calcium carbonate at conductivity in this range, while, on the other hand, the remaining water hardness acts as a buffer capacity for the absorption of dissolved carbonic acid during the compression, which would otherwise act aggressively. Thus, the pH of the cooling water 03 injected during the compression also lies between 6.5 to 8 and thus in a relatively neutral to slightly alkaline range. In this way, the corrosion and sedimentation processes induced by the cooling water 03 may be effectively reduced in the cooling water 03.

In the cooling water circuit, a conductivity sensor (not shown) may be arranged to determine the conductivity of the cooling water 03 continuously. When a given conductivity value is exceeded, the cooling water 03 in the cooling water circuit is replaced completely or partially by fresh water 09. The conductivity increases, for example as a result of corrosion processes. By this measure, it may be ensured that the contamination of the cooling water 03 is kept low. Alternatively, the cooling water 03 may be partially or completely replaced by fresh water 09 at predefined time intervals. In this case, conductivity measurement in the cooling water circuit may be entirely dispensed with.

LIST OF REFERENCE NUMERALS

01—Compressor system
02—Compressor
03—Cooling water
04—Compressed gas
05—Separator
06—
07—Heat exchanger
08—
09—Fresh water
10—Non-demineralized water
11—
12—Demineralized water
13—Control unit
14—Valves
15—Mixing Unit

The invention claimed is:

1. A method for controlling a water supply of a water-injected gas compressor, said gas compressor having a cooling water circuit at least partially defined by a heat exchanger in fluid communication with a portion of the gas compressor, into which is injected, as fresh water, demineralized water and non-demineralized water, comprising the following steps:
determining the electrical conductivity of the non-demineralized water;
determining a proportion of the demineralized water that must be added to the non-demineralized water to achieve a resulting mixture with a predetermined conductivity;

adding outside of the cooling circuit the determined proportion of demineralized water to the non-demineralized water to create a mixture, where the resulting mixture is the fresh water for the cooling water circuit; and supplying the fresh water to the cooling water circuit in a predetermined amount; wherein the determining steps take place before the step of adding the determined proportion of demineralized water.

2. A method according to claim 1, wherein the electrical conductivity of the demineralized water is determined and considered in the step of determining the proportion of the demineralized water that must be added.

3. A method according to claim 2, wherein the conductivity of the demineralized and non-demineralized water is determined by means of conductivity sensors.

4. A method according to claim 1, wherein a valve is actuated for the addition of the demineralized water.

5. A method according to claim 1, wherein furthermore a conductivity of a cooling water in the cooling water circuit is determined, whereby the cooling water in the cooling water circuit may be completely or partly replaced by the fresh water when a predetermined conductivity value is exceeded.

6. A method according to claim 1, wherein a cooling water within the cooling water circuit is completely or partly replaced by the fresh water at predefined time intervals.

7. A water-injected gas compressor comprising:
 a compression stage;
 a cooling water circuit at least partially defined by a heat exchanger in fluid communication with a portion of the compression stage, which is fluidly connected to the compression stage, whereby a cooling water is fed into the compression stage and returned therefrom;
 a water mixing unit, in which is mixed a necessary amount of demineralized water with non-demineralized water depending on a determined conductivity of the non-demineralized water in order to adjust the conductivity of a quantity of fresh water to a predetermined value, after which the fresh water is fed to the cooling water circuit.

8. A gas compressor according to claim 7, characterized in that no sensors are provided in the cooling water circuit to determine the conductivity of the cooling water.

9. A gas compressor according to claim 7, characterized in that the water mixing unit comprises one or a plurality of mixing valves, which are controlled to produce the fresh water depending on the predetermined conductivity value.

10. A method for controlling a water supply of a water-injected gas compressor, said gas compressor having a cooling water circuit at least partially defined by a heat exchanger in fluid communication with a portion of the gas compressor, into which is injected, as fresh water, demineralized water and non-demineralized water, comprising the following steps:
 determining the electrical conductivity of the non-demineralized water;
 determining a proportion of the non-demineralized water that must be added to the demineralized water to achieve a resulting mixture with a predetermined conductivity;
 adding outside of the cooling circuit the determined proportion of non-demineralized water to the demineralized water to create a mixture where the resulting mixture is the fresh water for the cooling water circuit; and
 supplying the fresh water to the cooling water circuit in a predetermined amount; wherein the determining steps take place before the step of adding the determined proportion of non-demineralized water.

11. A method according to claim 10, wherein the electrical conductivity of the demineralized water is determined and considered in the step of determining the proportion of the non-demineralized water that must be added.

12. A method according to claim 10, wherein the conductivity of the demineralized and non-demineralized water is determined by means of conductivity sensors.

13. A method according to claim 10, wherein a valve is actuated for the addition of the non-demineralized water.

14. A method according to claim 10, wherein furthermore a conductivity of a cooling water in the cooling water circuit is determined, whereby the cooling water in the cooling water circuit may be completely or partly replaced by the fresh water when a predetermined conductivity value is exceeded.

15. A method according to claim 10, wherein a cooling water within the cooling water circuit is completely or partly replaced by the fresh water at predefined time intervals.

* * * * *